United States Patent
Keivan et al.

(10) Patent No.: US 9,964,955 B2
(45) Date of Patent: May 8, 2018

(54) SYSTEM AND METHODS OF DETERMINING A GEOMETRIC POSE OF A CAMERA BASED ON SPATIAL AND VISUAL MAPPING

(71) Applicant: Canvas Technology, Inc., Boulder, CO (US)

(72) Inventors: Nima Keivan, Boulder, CO (US); Juan Falquez, Boulder, CO (US); Jonathan McQueen, Boulder, CO (US)

(73) Assignee: Canvas Technology, Inc., Boulder, CO (US)

( * ) Notice: Subject to any disclaimer, the term of this patent is extended or adjusted under 35 U.S.C. 154(b) by 173 days.

(21) Appl. No.: 15/228,459

(22) Filed: Aug. 4, 2016

(65) Prior Publication Data
US 2018/0039276 A1 Feb. 8, 2018

(51) Int. Cl.
*G06K 9/00* (2006.01)
*G05D 1/02* (2006.01)
(Continued)

(52) U.S. Cl.
CPC ......... *G05D 1/0246* (2013.01); *G01C 21/206* (2013.01); *G06K 9/00671* (2013.01);
(Continued)

(58) Field of Classification Search
CPC .............. G06K 9/00671; G06K 9/6215; G06T 2207/10028; G06T 7/0044; G01C 21/206; G05D 1/0246
See application file for complete search history.

(56) References Cited

U.S. PATENT DOCUMENTS 8,803,737 B2  8/2014  Bush et al.
9,069,794 B1 *  6/2015  Bandukwala ..... G06F 17/30256
(Continued)

FOREIGN PATENT DOCUMENTS

EP    2940426 A1    4/2015
WO    2015/017231 A1    2/2015
WO    2015/069560 A1    5/2015

OTHER PUBLICATIONS

Galvez-Lopez, Dorian, et al., "Bags of Binary Words for Fast Place Recognition in Image Sequences", IEEE Transactions on Robotics, 9 pp., Oct. 2012.
(Continued)

*Primary Examiner* — Amara Abdi
(74) *Attorney, Agent, or Firm* — James A. Sheridan; Sheridan Law, LLC

(57) ABSTRACT

The disclosure provides systems and methods of use pertaining to a visual mapping and transportation management system for determining a location of a user and directing a vehicle to the user's location. Embodiments include a navigation application installed upon a user's mobile computing device and configured to transmit a user image from the device to an image-matching server storing a map composed of keyframes, each having a stored image, a known geometric pose, and numerous extracted interest features. The server also includes a processor configured to extract interest features from the user image, compare the interest features between the user image and the stored images, identify common interest features between the two, and based on the common interest features and known geometric poses of the stored images, determine a global geometric pose of the user image before directing the vehicle to the user's location. Other embodiments are also disclosed.

20 Claims, 12 Drawing Sheets

(51) Int. Cl.
  *G06T 7/00* (2017.01)
  *G01C 21/20* (2006.01)
  *G06K 9/62* (2006.01)

(52) U.S. Cl.
  CPC .......... *G06T 7/0044* (2013.01); *G06K 9/6215* (2013.01); *G06T 2207/10028* (2013.01)

(56) References Cited

U.S. PATENT DOCUMENTS

| | | | |
|---|---|---|---|
| 9,129,179 B1* | 9/2015 | Wong | G06K 9/20 |
| 9,222,783 B2* | 12/2015 | Kansal | G01C 21/20 |
| 9,288,636 B2 | 3/2016 | McClendon | |
| 2007/0127822 A1 | 6/2007 | Boose | |
| 2009/0119590 A1 | 5/2009 | Kondziela et al. | |
| 2009/0219209 A1 | 9/2009 | Bush et al. | |
| 2011/0064312 A1 | 3/2011 | Janky et al. | |
| 2011/0087666 A1 | 4/2011 | Chou et al. | |
| 2012/0076423 A1 | 3/2012 | Tang et al. | |
| 2012/0310968 A1* | 12/2012 | Tseng | G06F 17/30247 707/769 |
| 2013/0141565 A1 | 6/2013 | Ling | |
| 2013/0211718 A1 | 8/2013 | Yoo et al. | |
| 2013/0332482 A1* | 12/2013 | Son | G06F 17/30247 707/769 |
| 2014/0004884 A1* | 1/2014 | Chang | H04W 4/025 455/456.3 |
| 2014/0279860 A1* | 9/2014 | Pan | G06F 17/30277 707/609 |
| 2015/0125045 A1* | 5/2015 | Gauglitz | G06T 7/2033 382/107 |
| 2015/0133146 A1* | 5/2015 | McClendon | H04W 4/043 455/456.1 |
| 2015/0134689 A1 | 5/2015 | McClendon | |
| 2015/0134690 A1* | 5/2015 | McClendon | H04W 4/043 707/769 |
| 2015/0170418 A1* | 6/2015 | Flynn | G06F 3/04815 345/633 |
| 2015/0381948 A1* | 12/2015 | Renkis | H04N 7/181 348/47 |
| 2016/0063732 A1 | 3/2016 | Chen et al. | |
| 2016/0189416 A1* | 6/2016 | Naguib | G06T 15/00 345/441 |

OTHER PUBLICATIONS

Galvez-Lopez, Dorian, et al., "Real-Time Loop Detection with Bags of Binary Words", 8 pp., Sep. 25-30, 2011.

* cited by examiner

| Extracted Interest Feature | Fequency | Keyframe | Stored Image |
|---|---|---|---|
| $132_1$ | 2 | $126_{1,3}$ | $128_{1,3}$ |
| $132_2$ | 2 | $126_{1,3}$ | $128_{1,3}$ |
| $132_3$ | 2 | $126_{1,3}$ | $128_{1,3}$ |
| $132_4$ | 3 | $126_{1,2,3}$ | $128_{1,2,3}$ |
| $132_5$ | 2 | $126_{1,3}$ | $128_{1,3}$ |
| $132_6$ | 2 | $126_{1,3}$ | $128_{1,3}$ |
| $132_7$ | 3 | $126_{1,2,3}$ | $128_{1,2,3}$ |
| $132_8$ | 3 | $126_{1,2,3}$ | $128_{1,2,3}$ |
| $132_9$ | 2 | $126_{1,3}$ | $128_{1,3}$ |
| $132_{10}$ | 2 | $126_{1,3}$ | $128_{1,3}$ |
| $132_{11}$ | 2 | $126_{1,3}$ | $128_{1,3}$ |

SYSTEM AND METHODS OF DETERMINING A GEOMETRIC POSE OF A CAMERA BASED ON SPATIAL AND VISUAL MAPPING

BACKGROUND

Generally, a mobile computing device, whether an autonomous robot or a tablet computer, smartphone, or other wired or wireless device associated with a human user, determines a geographic location by leveraging geolocation information gathered by a global positioning system (GPS) receiver operating upon the computing device. The GPS is a space-based navigation system that provides location and time information continually transmitted from a number of GPS satellites. To determine a location in real-time, the GPS receiver operating upon the mobile computing device monitors multiple satellites that are in view of the receiver and executes triangulation equations to determine the precise position of the receiver and, therefore, the mobile computing device.

The space-based navigation system provided by the GPS has become the typical mechanism by which mobile computing devices determine their respective locations. Data collected by the Federal Aviation Administration (FAA) shows that civilian GPS receivers can in optimal circumstances provide horizontal accuracy to within a meter (www.gps.gov), though accuracy is seriously impacted by several factors, including atmospheric effects, sky blockage (e.g., indoor use), and receiver quality.

Other navigation systems rely on wireless network access point models or various triangulation methods (e.g., cell tower triangulation) to determine a geolocation of an associated mobile computing device.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

One embodiment provides a visual mapping and transportation management system for determining a location of a user and directing a vehicle to the user's location. The system includes a navigation application installed upon a user's mobile computing device, the navigation application configured to transmit a user image captured by a camera on the user's mobile computing device to an image-matching server over a communication channel, the image-matching server having a place-recognition processor and a memory that stores a map comprising a framework of linked keyframes. Each of the keyframes may include a stored image, a known geometric pose corresponding to the stored image relative to a map origin, and a number of interest features extracted from the stored image. The place-recognition processor may be configured for (1) extracting a number of interest features from the user image; (2) comparing the interest features extracted from the user image to the interest features extracted from the stored images of the map; (3) identifying one or more common interest features between the user image and the stored images; (4) based on the common interest features and the known geometric poses of the stored images, iteratively determining a global geometric pose of the user image relative to the map origin; and (5) directing, over the communication channel, the vehicle to the user's location based on the global geometric pose of the user image.

Another embodiment provides an image-based method of estimating a location of a user of a transportation service and directing a vehicle to the location of the user. The method includes (1) providing a navigation application to a user for installation on a mobile computing device; and (2) receiving, at an image-matching server and sent from the mobile computing device over a communication channel, a user image captured by the camera, the image-matching server comprising a place-recognition processor and a memory that stores a map comprising a framework of linked keyframes, each of the keyframes including a stored image, known location information corresponding to the stored image relative to a map origin, and a number of interest features extracted from the stored image, wherein the place-recognition processor (a) extracts a number of interest features from the user image; (b) compares the interest features extracted from the user image to the interest features extracted from the stored images of the map; (c) identifies one or more common interest features between the user image and the stored images; (d) based on the common interest features, selects a number of candidate images from the stored images of the map, each of the candidate images having a high probability of being co-located with the user image; (e) based on triangulated depth values and on the common interest features shared by the user image and each of the candidate images, estimates a relative geometric pose between the user image and each of the candidate images; (f) selects a matching image from the candidate images, the matching image representing the candidate image having a minimum shift between the known geometric pose of the candidate image and the relative geometric pose of the user image in relation to the candidate image; (g) photometrically aligns the user image with the matching image to refine the relative geometric pose of the user image; (h) compounds the known geometric pose of the matching image and the relative geometric pose of the user image in relation to the matching image, thereby calculating a global geometric pose of the user image in relation to the map origin; and (i) based on the global geometric pose of the user image, directs over the communication channel the vehicle to the location of the user.

Yet another embodiment provides a non-transitory computer-readable medium with computer-executable instructions stored thereon executed by a place-recognition processor to perform an image-based method of determining a location of a camera on a mobile computing device of a user of a transportation service and directing a vehicle to the location. The method includes (1) receiving, over a communication channel from a navigation application installed upon the user's mobile computing device, a user image captured by the camera on the user's mobile computing device; (2) extracting a number of interest features from the user image; (3) accessing a map stored in the computer-readable medium, the map comprising a framework of linked keyframes, each of the keyframes including a stored image, a known geometric pose corresponding to the stored image relative to a map origin, and a number of interest features extracted from the stored image; (4) comparing the interest features extracted from the user image to the interest features extracted from the stored images; (5) identifying one or more common interest features between the user image and the stored images; (6) based on the common interest features and the known geometric poses associated with each of the interest features extracted from the stored images, determining the location of the camera on the user's mobile computing device; and (7) directing, via the communication channel, the vehicle to the location of the camera on the user's mobile computing device.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Figure 1:
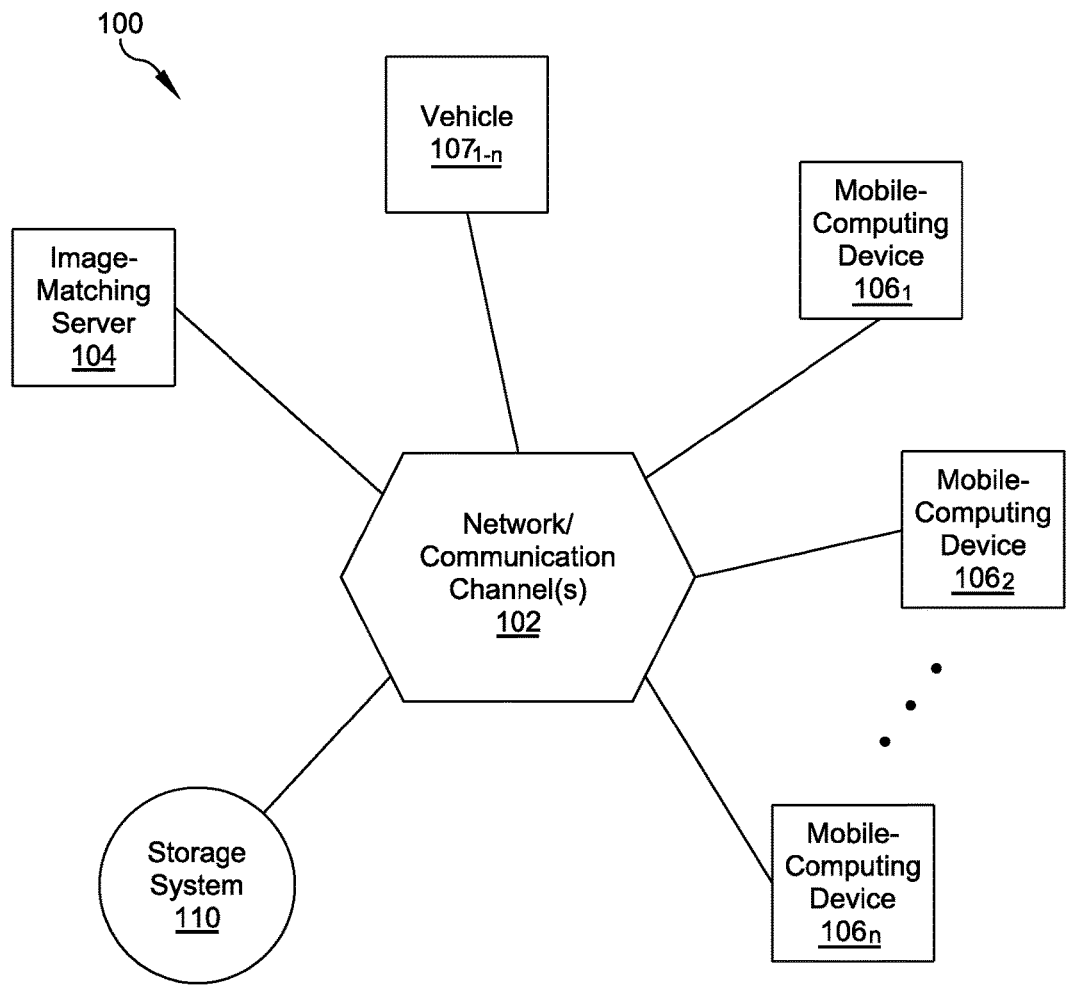
FIG. 1 provides a functional schematic of one embodiment of a visual mapping and transportation management system.

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Overview

The technology discussed herein relates to a mechanism by which a location of a user of a camera-enabled mobile computing device may be determined using an image captured by the camera incorporated within the device for the purpose of directing a vehicle to an exact location of the user/user's mobile computing device. For instance, when a mobile computing device is in use, either by a person, a robot, or another camera-enabled piece of equipment (e.g., a car), typical geographic positioning systems such as the global positioning system (GPS) or other triangulation methods that make use of cellular or local network access (e.g., 4G, WiFi) may be unavailable or undesirable. Oftentimes, geographic positioning systems such as GPS systems do not function adequately when the mobile computing device is located indoors or located in urban or rural environments that present a great deal of sky blockage (e.g., in the form of buildings or mountains, respectively). In these circumstances, traditional GPS systems often fail entirely or provide inaccurate and/or unreliable positioning results.

Beyond the operational and accuracy issues discussed above, traditional geographic positioning systems such as the GPS can require specialized hardware and are processing intensive and power/battery consumptive. For example, a dedicated camera generally lacks a GPS receiver and is unable to locate itself via GPS navigation. When present on the device, enabling the GPS receiver on a smartphone, tablet computer, laptop computer, autonomous robot, or any other mobile computing device is notoriously draining on the mobile computing device's battery. Further, triangulation methods that leverage wireless networks (e.g., cellular or WiFi) require the computing device's processor to perform triangulation calculations, diverting battery power needed by other applications.

Fast, efficient, and accurate location estimation and navigation is particularly important in the context of indoor vehicle transportation management and direction involving, for example, vehicle delivery to a desired location within a warehouse such as cart delivery within an indoor lumber yard or a retail storage and/or shipping facility. In this context, a vehicle driven by a person, an autonomous robotic cart for the transportation of people, or a robotic cart for the transportation of materials may require direction about an indoor or otherwise GPS-denied facility. This type of direction, in turn, requires accurate location estimation within the facility, which enables the efficient direction of vehicles about the facility to various desired locations for people and/or material pick-up and/or drop-off.

Accurate location estimation is also integral in the context of today's car-for-hire business models. That is, in GPS-denied or GPS-restricted environments, car services such as Uber® and Lyft® can experience navigational failures caused by insufficient GPS navigation. For example, a user desiring pick-up may be sitting within a hotel restaurant located in an urban environment. While the passenger's GPS system may technically function, it might only locate the passenger to the city block upon which he or she sits due to reduced GPS-positioning results resulting from sky blockage and other interferences. As a result, when the requested car arrives to retrieve the passenger at the location estimated by the passenger's GPS, the car arrives to the opposite side of the building from the passenger's location or from the nearest exit to where the passenger was sitting within the restaurant and from which the passenger has exited to the street. As a result, the driver and the prospective passenger must contact one another via cellular phone or text to determine the passenger's actual location before the driver and passenger are able to determine a successful meeting place. This type of misconnect between the passenger and the driver is frustrating and time consuming for both parties, and can lead to low user ratings for one or both parties, skewing the rating system through no fault of either party. Similar experiences can occur when the passenger is located outdoors on the street or in a more rural environment with rocks, foliage, mountains, and/or other sky blockage.

As may be appreciated, based on the disclosure, there exists a need for an image-based system of location estimation and vehicle direction that does not rely on GPS navigation or other power and processor intensive triangulation navigation mechanisms. Various embodiments of the systems and methods described herein relate to a visual mapping and transportation management system for determining a location of a person or an autonomous robot (a "system user" or "user") and directing a vehicle to the user's location. The visual mapping and transportation management system enables the user to request a vehicle using a camera-enabled mobile computing device within GPS-denied environments. More specifically, the user may capture an image or video stream (a "user image") with the camera on the user's mobile computing device before uploading the user image over a communication channel/network to an image-matching server, which includes a memory that stores a metric-relative map composed of a framework of linked keyframes. Each keyframe may include a stored image along with a known geometric pose, or a known position and orientation relative to an origin of the stored map, corresponding to the stored image (an "image-pose pair"), as well as a number of interest features previously extracted from the stored image.

The image-matching server may also include a place-recognition processor that performs a series of computations to compare a number of interest features extracted from the user image to the interest features extracted from the stored images of the keyframes and estimate, based on the comparison and the known geometric poses of the stored images, a global geometric pose of the camera that captured the user image relative to the origin of the map. Therefrom, the processor knows a global geometric pose of the user's mobile computing device and may extrapolate a location of the user himself. Once the user's location has been determined, the place-recognition server may direct the vehicle to the user's location.

The image-based system of location estimation and vehicle direction described above allows for fast and accurate positioning within GPS-denied or restricted environments. Use of the system is intuitive for users and requires little user interaction. Further, the user's mobile electronic device is not burdened with cumbersome processing tasks that consume both battery and computing power. Nor does the device have to operate a power-consumptive GPS transmitter. Instead, the user's location may be quickly computed at the remote server before a vehicle is sent to the user's location.

Exemplary System

Generally, when elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software or in a combination thereof (including firmware, resident software, micro-code, state machines, gate arrays, etc.). As used herein, a software component may include any type of computer instruction or computer executable code located within or on a non-transitory computer-readable storage medium/memory. A software component may, for instance, comprise one or more physical or logical blocks of computer instructions, which may be organized as a routine, program, object, component, data structure, etc., that performs one or more tasks or implements particular data types.

Furthermore, the subject matter may take the form of a computer program product on a computer-usable or computer-readable storage medium/memory having computer-usable or computer-readable program code embodied in the medium for use by or in connection with an instruction execution system. In the context of this document, a computer-usable or computer-readable storage medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, computer readable media may comprise computer storage media and communication media.

Computer storage media/memory includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, the term communication media or channel includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, processors, or other devices. Generally, program modules include routines, programs, objects, components, data structures, etc. that perform particular tasks/functions or implement particular abstract data types. Typically, the functionality of the program modules may be combined or distributed as desired in various embodiments. Software implementations may include one or more computer programs comprising executable code/instructions that, when executed by a processor, may cause the processor to perform a method defined at least in part by the executable instructions. The computer program can be written in any form of programming language, including complied or interpreted languages, and can be deployed in any form, including as a standalone program or as a module, component, subroutine, or other unit suitable for use in a computing environment.

Figure 2:
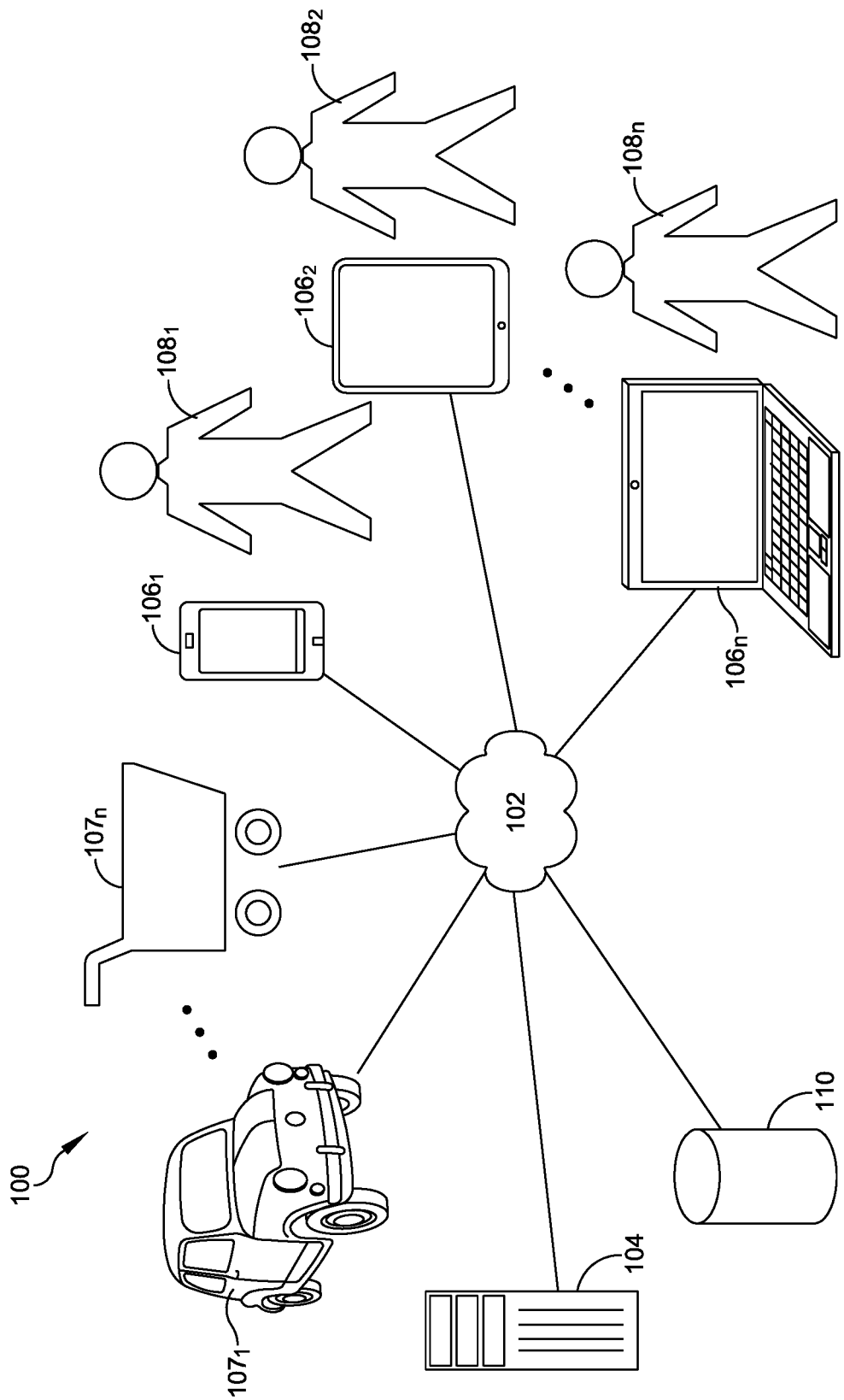
FIG. 2 provides another functional schematic of the visual mapping and transportation management system of FIG. 1.

FIGS. 1-2 illustrate functional schematics of one exemplary embodiment of a visual mapping and transportation management system 100. In this embodiment, system 100 may include a network of communication channels 102 that connects an image-mapping server 104 with a number of mobile computing devices $106_{1-n}$, operated by users $108_{1-n}$. Network 102 may also connect image-mapping server 104 with a number of vehicles $107_{1-n}$, each of which is configured for direction to a location of the relevant mobile computing device $106_{1-n}$ and its user $108_{1-n}$. Embodiments of image-matching server 104 may access a storage system 110, which may be all or partially incorporated within server 104 or independently located at a single location or distributed locations.

Figure 3:
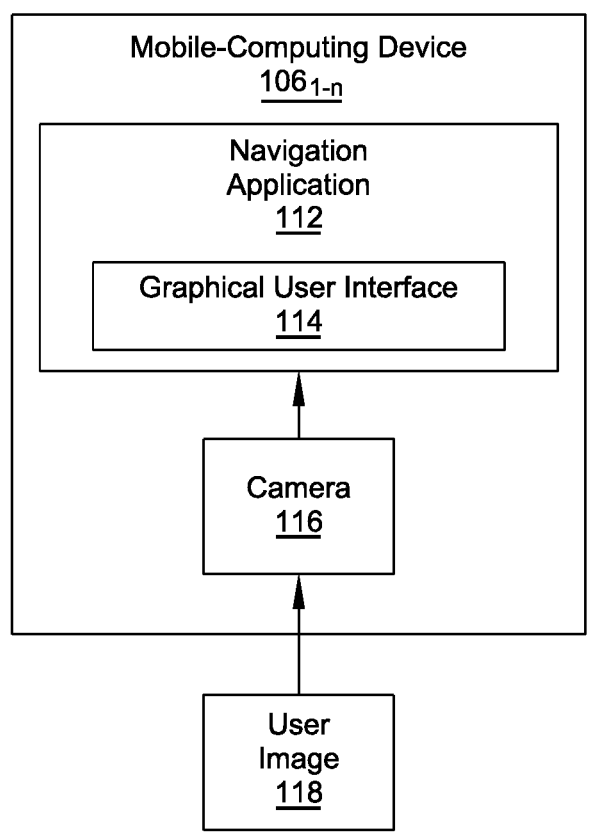
FIG. 3 provides a functional schematic of a mobile computing device of a user of the system of FIG. 1.

For the purposes of concise explanation, further discussion of system 100 is framed in the context directing a singular vehicle $107_{1-n}$ to a select mobile computing device $106_{1-n}$ and user $108_{1-n}$. FIG. 3 illustrates a functional schematic of one embodiment of mobile computing device $106_{1-n}$, which may be any appropriate camera-enabled mobile computing device such as, by way of limited example, a mobile phone or smartphone, a tablet computer, a laptop computer, a network-enabled digital camera, or a camera-enabled robot. In this embodiment, mobile computing device $106_{1-n}$ may include a navigation application 112 installed upon mobile computing device $106_{1-n}$ and featuring a graphical user interface 114. Mobile computing device $106_{1-n}$ may also include a camera 116 configured to capture a still image or video stream (a "user image") 118 depicting an area or space surrounding mobile computing device $106_{1-n}$ and, therefore, indicating a location of user $108_{1-n}$ (a "user's location").

Figure 4:
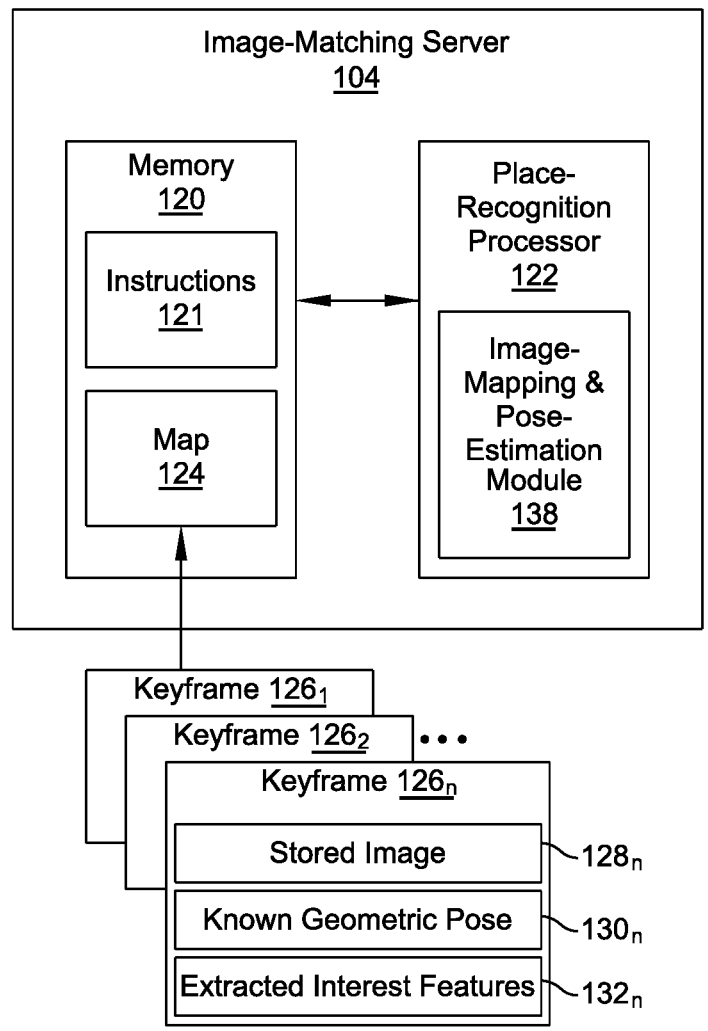
FIG. 4 provides a functional schematic of an image-matching server of the system of FIG. 1.

Navigation application 114 may transmit user image 118 over network 102 to image-matching server 104 for an image-based computational determination of a global geometric pose of camera 116 and, based thereon, a determination of the user's location to which vehicle $107_{1-n}$ may be directed. FIG. 4 illustrates a functional schematic of one embodiment of image-matching server 104. In this embodiment, image-matching server 104 may include a memory 120 and a place-recognition processor 122. Memory 120 may store a set of instructions 121 for execution by an image-mapping and pose-estimation module 138 of place-recognition processor 122. Memory 120 may also store a map 124 composed of a framework of linked keyframes $126_{1-n}$, each including a stored image $128_{1-n}$, a known geometric pose $130_{1-n}$ corresponding to stored image $128_{1-n}$, and a number of interest features $132_{1-n}$ extracted from stored image $128_{1-n}$.

Figure 5:
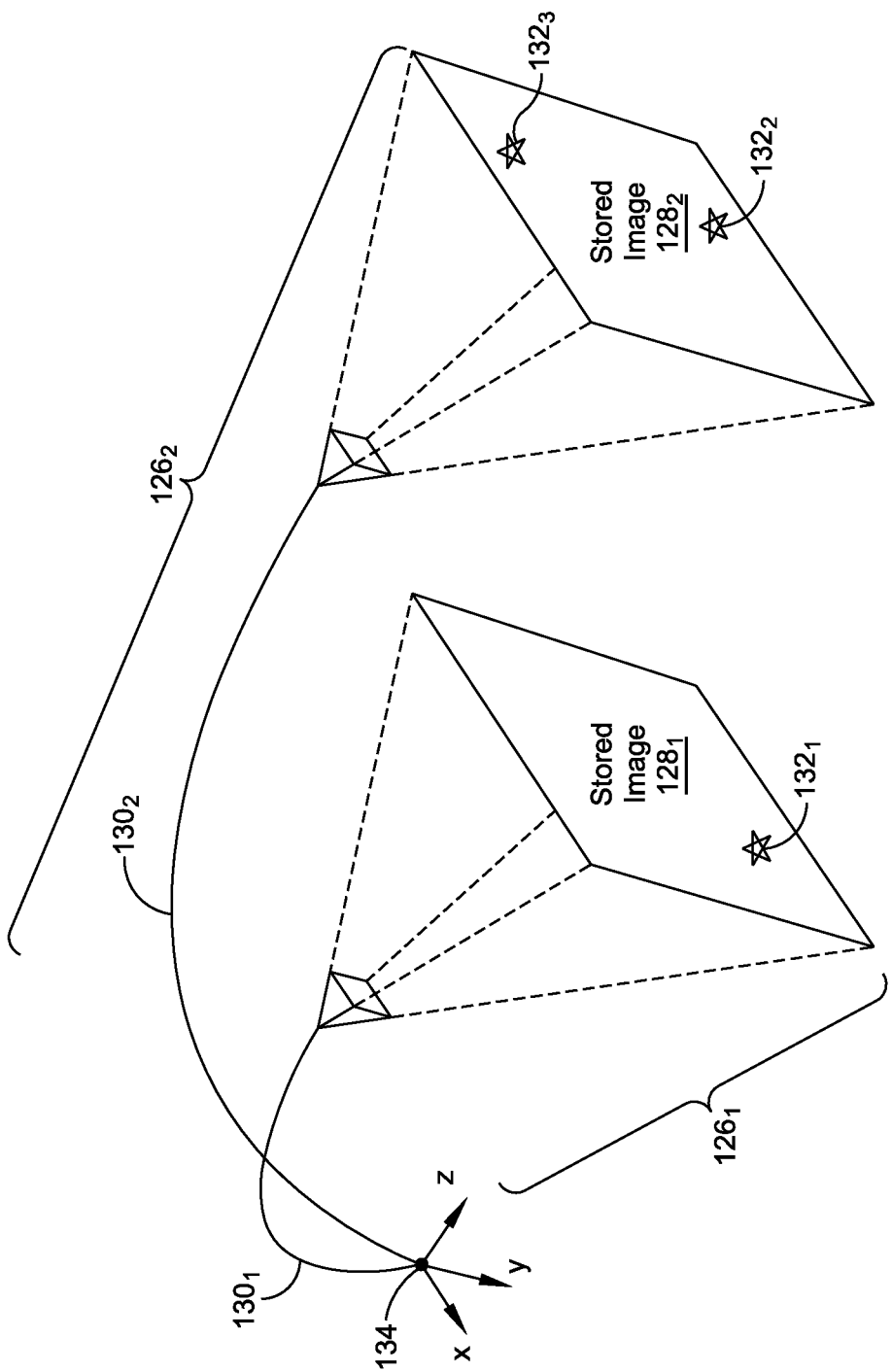
FIG. 5 provides a schematic of an exemplary portion of a metric-relative map for storage within a memory of the image-matching server of FIG. 4.

To demonstrate a structure of map 124, FIG. 5 illustrates a schematic composed of two keyframes $126_1$ and $126_2$ comprising stored images $128_1$ and $128_2$, respectively, that link to form a portion of map 124. Each known geometric pose $130_{1, 2}$ indicates a position and orientation, in six degrees of freedom, of a camera that captured the stored images $128_{1, 2}$ with respect to a map origin 134. Each respective stored image $128_{1-n}$ and known geometric pose $130_{1-n}$ combine to form a pose-image pair associated with the corresponding keyframe $126_{1-n}$. Collectively, the pose-image pairs combine to form the metric-relative map 124.

Stored images $128_{1-n}$ and their corresponding known geometric poses $130_{1-n}$ may be incrementally constructed by a camera-enabled autonomous vehicle or robot programmed to navigate the space to be covered by map 124. The position and orientation information required to assign known geometric poses $130_{1-n}$ may be detected and/or calculated using a variety of mapping, surveying, and/or positioning techniques including, for example, camera-based localization techniques, simultaneous localization and mapping techniques ("SLAM" techniques), wheel odometry, GPS positioning, and/or lidar positioning.

Figure 6A:
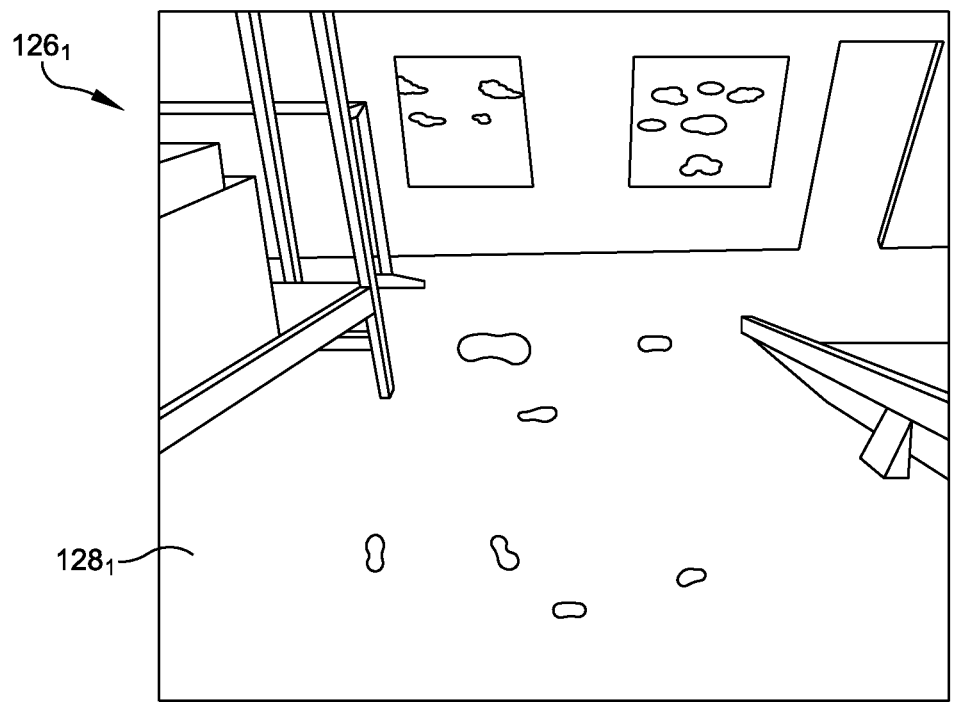
FIGS. 6A-6C provide images of three example keyframes for storage within the map of FIG. 5.
Figure 6B:
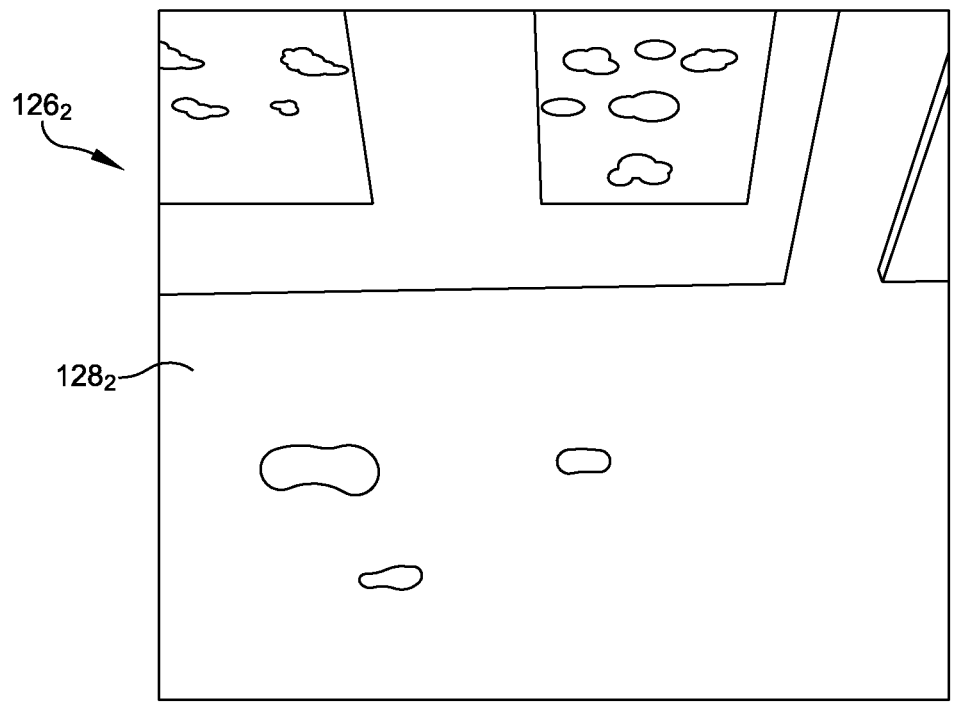
Figure 6C:
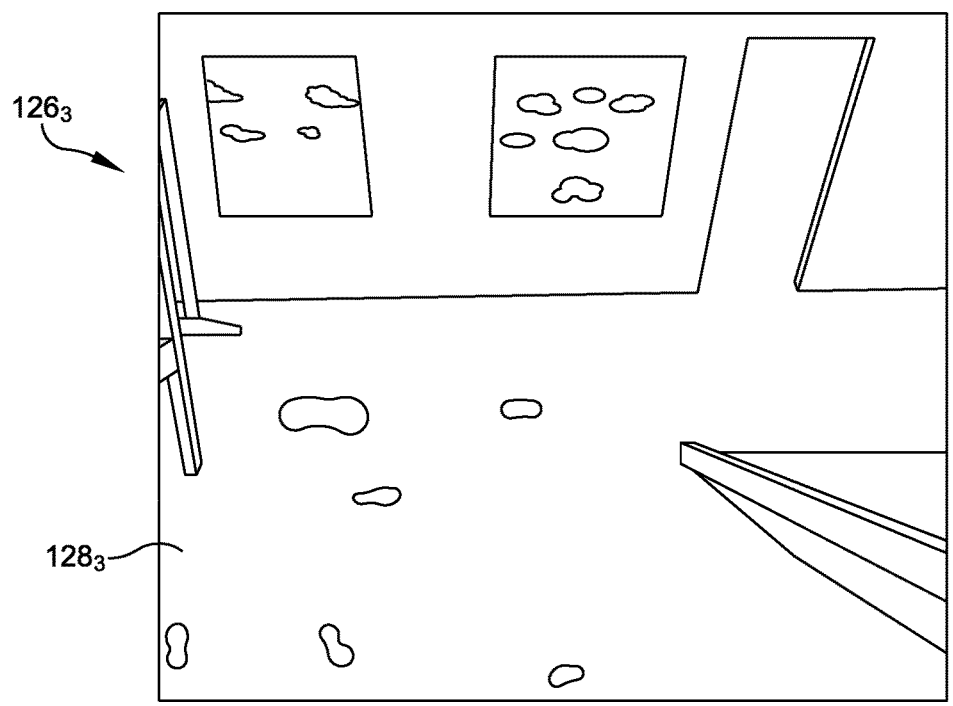
Figure 7A:
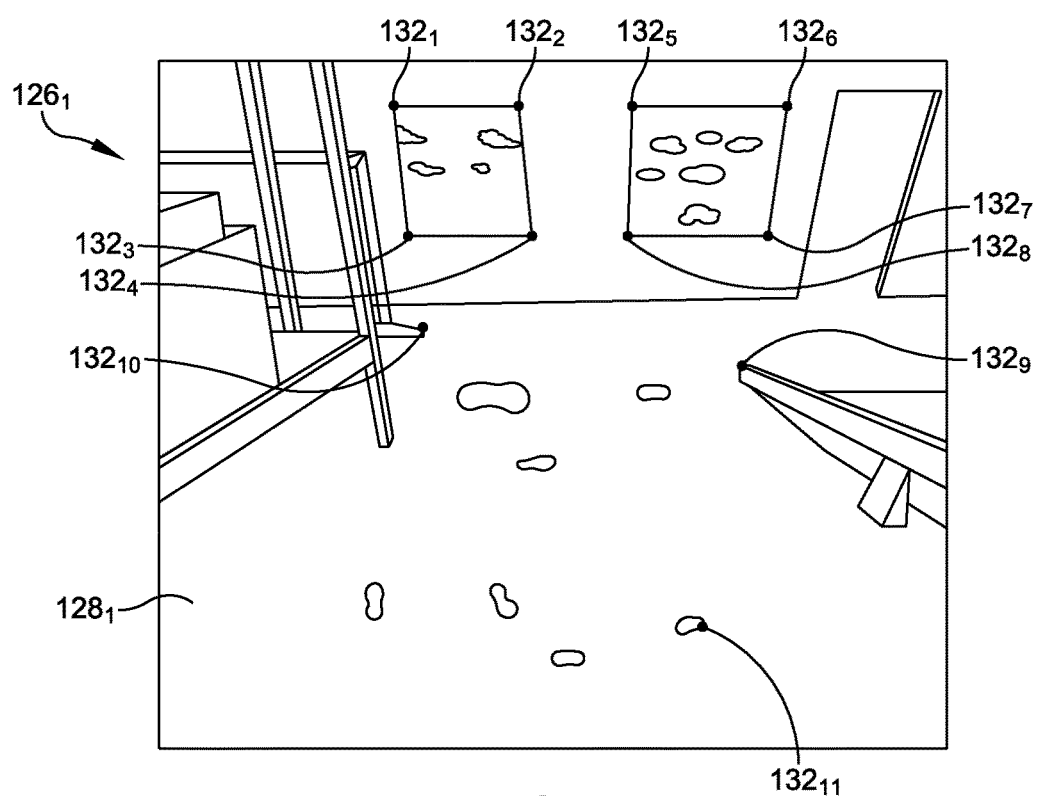
FIGS. 7A-7C provide images of the keyframes of FIGS. 6A-6C, respectively, with a number of extracted interest features.
Figure 7B:
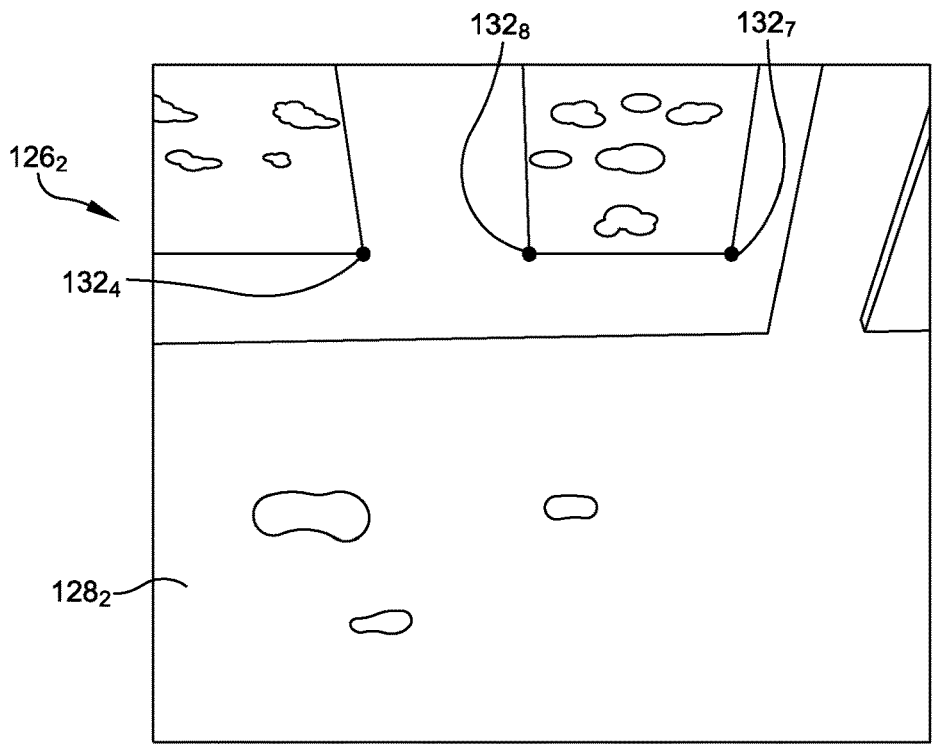
Figure 7C:
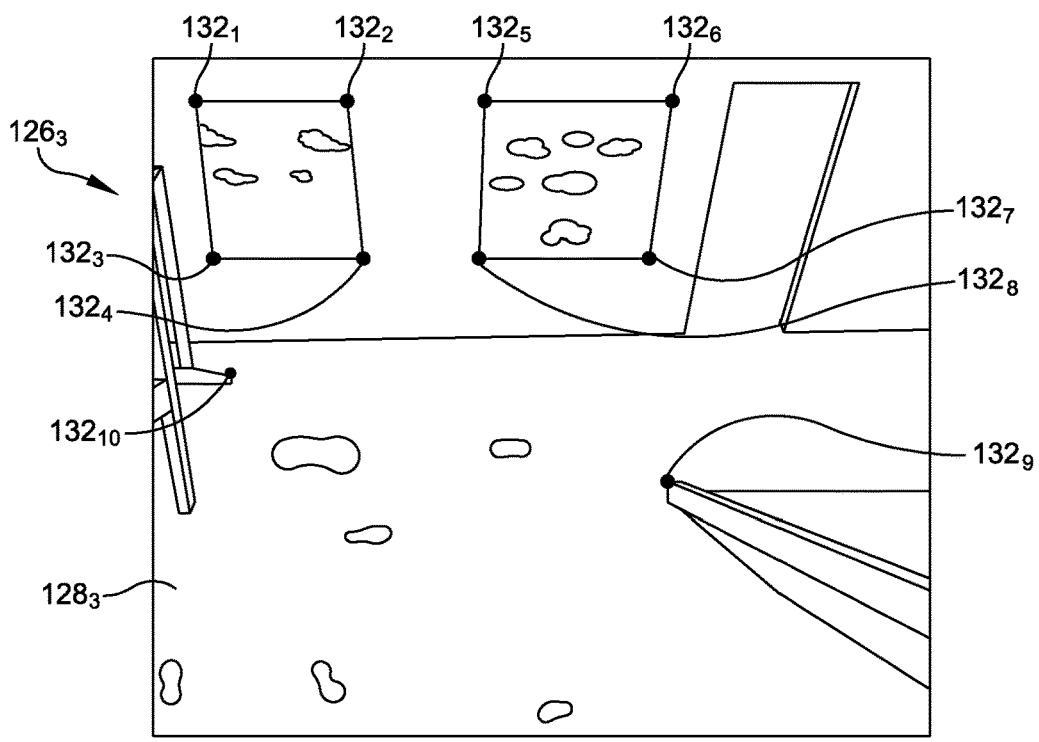

Interest features $132_{1-n}$ extracted from each stored image $128_{1-n}$ of keyframes $126_{1-n}$ represent small regions (e.g., 11×11 pixels) of each image that have distinct, recognizable, and/or distinguishing characteristics/properties containing a large amount of information that can be correlated between different images of the same location without risking ambiguous correlations. Exemplary interest features include corners, edges, highlighting, surface markings, shadows, and so on. To demonstrate, FIGS. 6A-6C reflect exemplary stored images $128_{1, 2, 3}$, each depicting different, but overlapping, areas of a storage room containing a linoleum floor, shelving, and two white boards. FIGS. 7A-7C show the same images $128_{1, 2, 3}$ having a number of exemplary interest features $132_{1-11}$ extracted from each image $128_{1, 2, 3}$ in which the relevant interest features are present.

Figures 8, 9A:
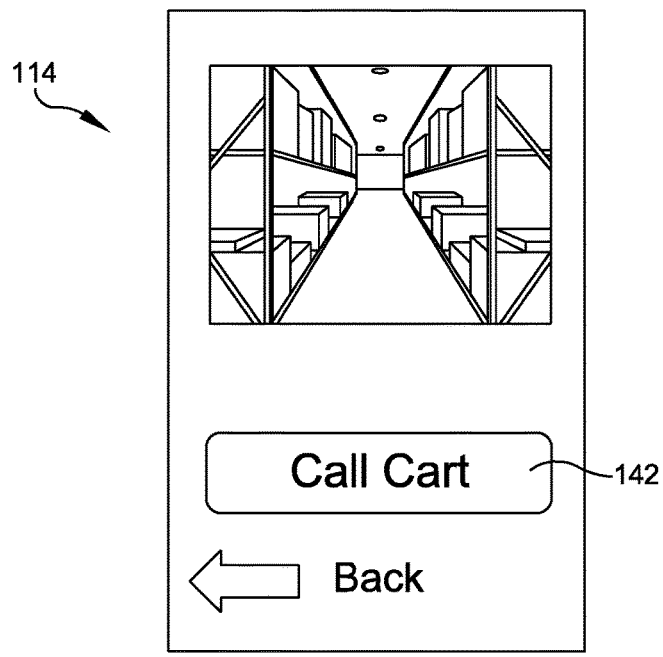
FIG. 8 provides an exemplary inverted index for mapping the extracted interest features of FIGS. 7A-7C to locations within the map of FIG. 5.
FIGS. 9A-9C illustrate screenshots of an exemplary graphical user interface for a navigation application installed upon the mobile computing device of FIG. 3.

To facilitate the querying of keyframes $126_{1-n}$ and stored images $128_{1-n}$, which speeds the process of comparing user image 118 to stored images $128_{1-n}$ of keyframes $126_{1-n}$, as discussed above, an inverted index may be stored in memory 120. FIG. 8 depicts one embodiment of a partial, exemplary inverted index 140, which maps the interest features extracted from stored images $128_{1-n}$ and shown in FIGS. 7A-7C, or interest features $132_{1-11}$, to their locations within keyframes $126_{1, 2, 3}$ and stored images $128_{1, 2, 3}$ of map 124. The index facilitates the querying of keyframes and streamlines the process of comparing the interest features extracted from user image 118 against those extracted from stored images $128_{1-n}$ to identify a number of candidate images that have a high probability of being co-located with user image 118, as detailed below in relation to FIGS. 10-11.

In operation of system 100, and in relation to FIGS. 1-4 discussed above, a user may interact with system 100 via GUI 114 of navigation application 112, which is installed upon or accessible to mobile-computing device $106_{1-n}$. Using camera 116, user image 118 may be captured before being transmitted over communication channel 102 to image-matching server 104, where place-recognition processor 122 may execute instructions 121, thereby causing processor 122 to extract a number of interest features from user image 118, compare the interest features extracted from user image 118 to interest features $132_{1-n}$ of stored images $128_{1-n}$ and determine, via image-matching and pose-estimation module 138, a global geometric pose for user image 118 (and thus camera 116) relative to map origin 134, as detailed below in relation to reference to FIGS. 10-11. A location of user $108_{1-n}$, may then be extrapolated from the global geometric pose of user image 118, enabling processor 122 to direct vehicle $107_{1-n}$ to the location of the user. In one embodiment, the comparison of interest features between user image 118 and stored images $128_{1-n}$ and the resulting detection of similarities between user image 118 and stored images $128_{1-n}$ carried out by image-matching and pose-estimation module 138 may be based on bag-of-words methodologies.[1], [2]

[1] Dorian Gálvez-López and Juan D. Tardós, "Real-Time Loop Detection with Bags of Binary Words," *International Conference on Intelligent Robots and Systems*, September 2011.

[2] R. Paul and P. Newman, "FAB-MAP 3D: Topological Mapping with Spatial and Visual Appearance," *International Conference on Robotics and Automation*, 2010 IEEE, Anchorage, Ak.

Figure 9B:
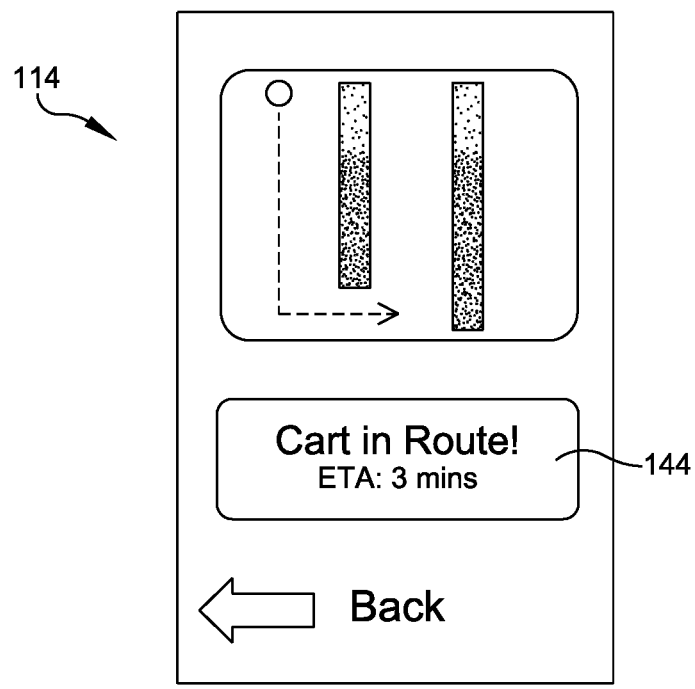
Figure 9C:
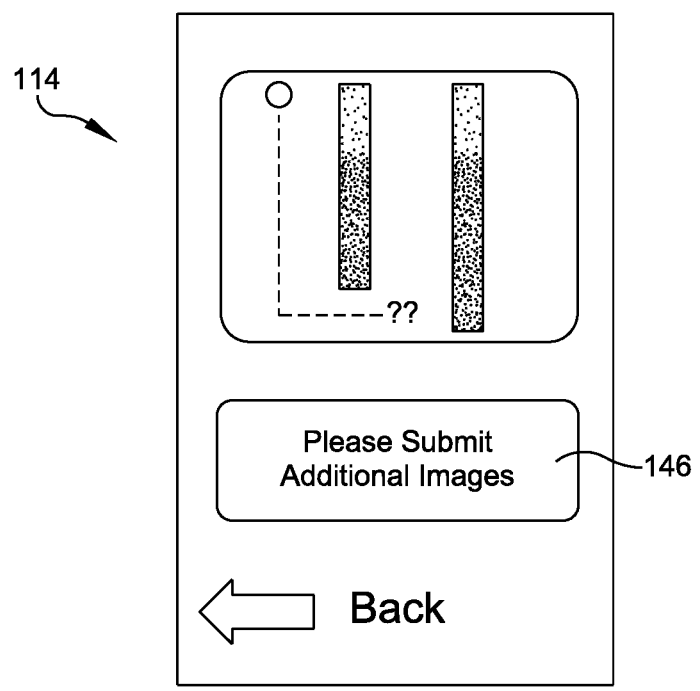

FIGS. 9A-9C depict an exemplary embodiment of GUI 114. In this embodiment, and as shown in FIG. 9A, GUI may include a "call cart" button 142 that initiates the transmission of user image 118, being a single image frame or a video stream, to image-matching server 104 over communication channel 102. If image-matching server 104 is successful in determining the user's location, GUI 114 may display a status button 144 that alerts user $108_{1-n}$ that the requested vehicle $107_{1-n}$ is in route and provide an estimated time of arrival, as shown in FIG. 9B. GUI 114 may also provide a mechanism by which user $108_{1-n}$ may verify the location and cancel if the location is incorrect. If image-matching server 104 is unable to determine the user's location, GUI 114 may display a request button 146 that asks user $108_{1-n}$ to submit another user image 118 for analysis, as shown in FIG. 9C. To guide better user images, GUI 114 may include image-quality indicators overlaid on the viewfinder of mobile computing device $106_{1-n}$ to assist with capturing better images that, for example, look straight ahead rather than at the ground or ceiling. Such indicators may receive feedback from an accelerometer on mobile computing device $106_{1-n}$ with respect to the Earth's gravity vector. Alternatively or additionally, GUI 114 may include positioning indicators overlaid on the viewfinder that signal the user to rotate the camera to achieve a different view, or to look around the space. Such positioning indicators may receive feedback from a gyroscope incorporated within the mobile computing device $106_{1-n}$ to obtain a rate of rotation about a vertical axis. GUI 114 may have any appropriate look and feel and may be tailored to the user's mobile computing device $106_{1-n}$.

Exemplary Method

Figure 10:
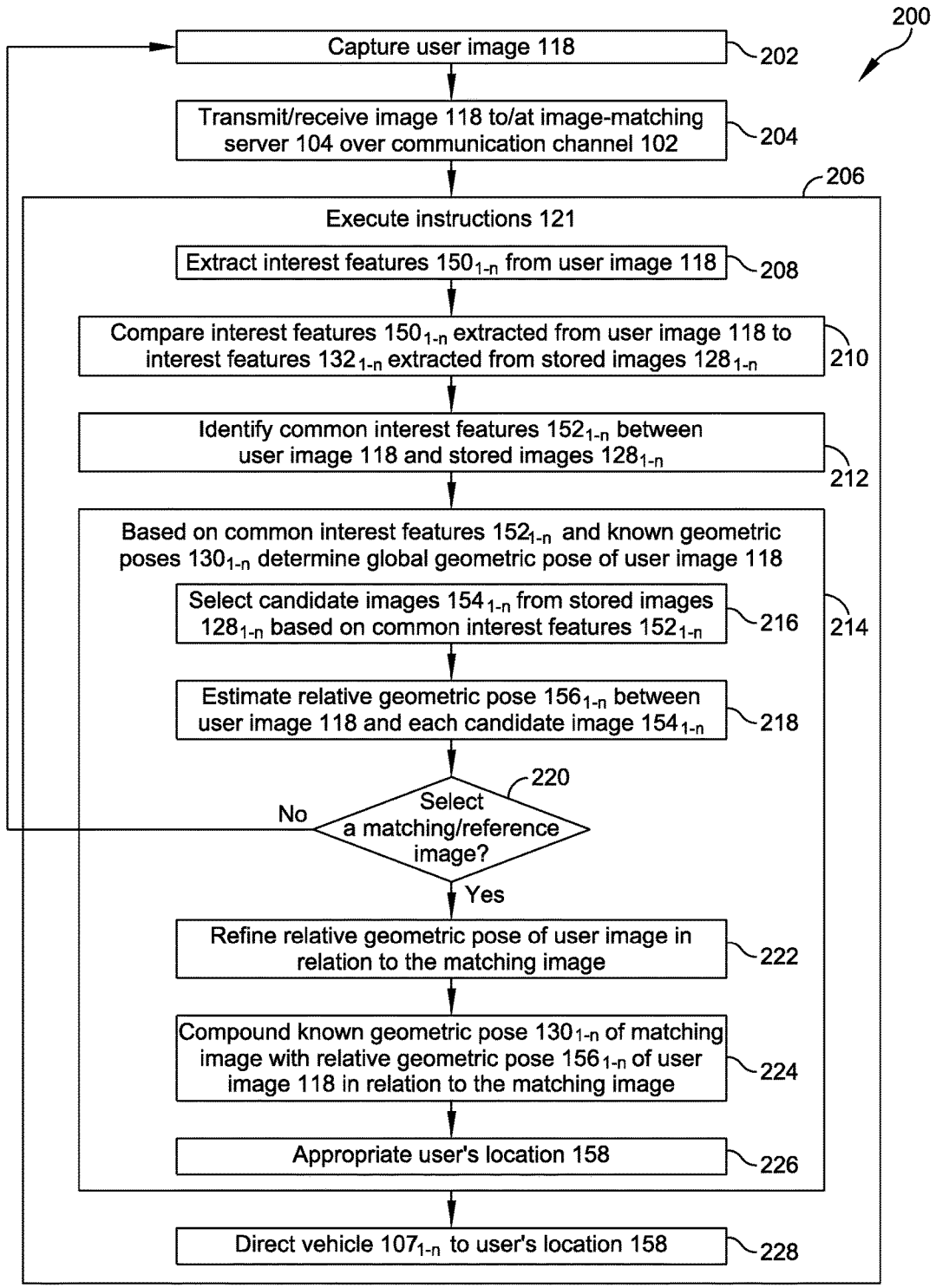
FIG. 10 provides a flowchart depicting an exemplary method of use for the visual mapping and transportation management system of FIGS. 1-2.

FIG. 10 provides a flow chart depicting an exemplary method 200 of using system 100 to determine a location of user $108_{1-n}$ and direct a vehicle $107_{1-n}$ to the user's location. In this embodiment, method 200 begins when camera 116 of user's mobile computing device $106_{1-n}$ captures user image 118 (202), and user image 118 is transmitted to/received by image-matching server 104 over communication channel 102 (204). After receiving user image 118, place-recognition processor 122 of image-matching server 104 may execute instructions 121 to apply image-mapping and pose-estimation module 138 (206), which may involve a number of steps to determine a global geometric pose of user image 118 and extrapolate the user's location therefrom. These steps are detailed below.

Figure 11:
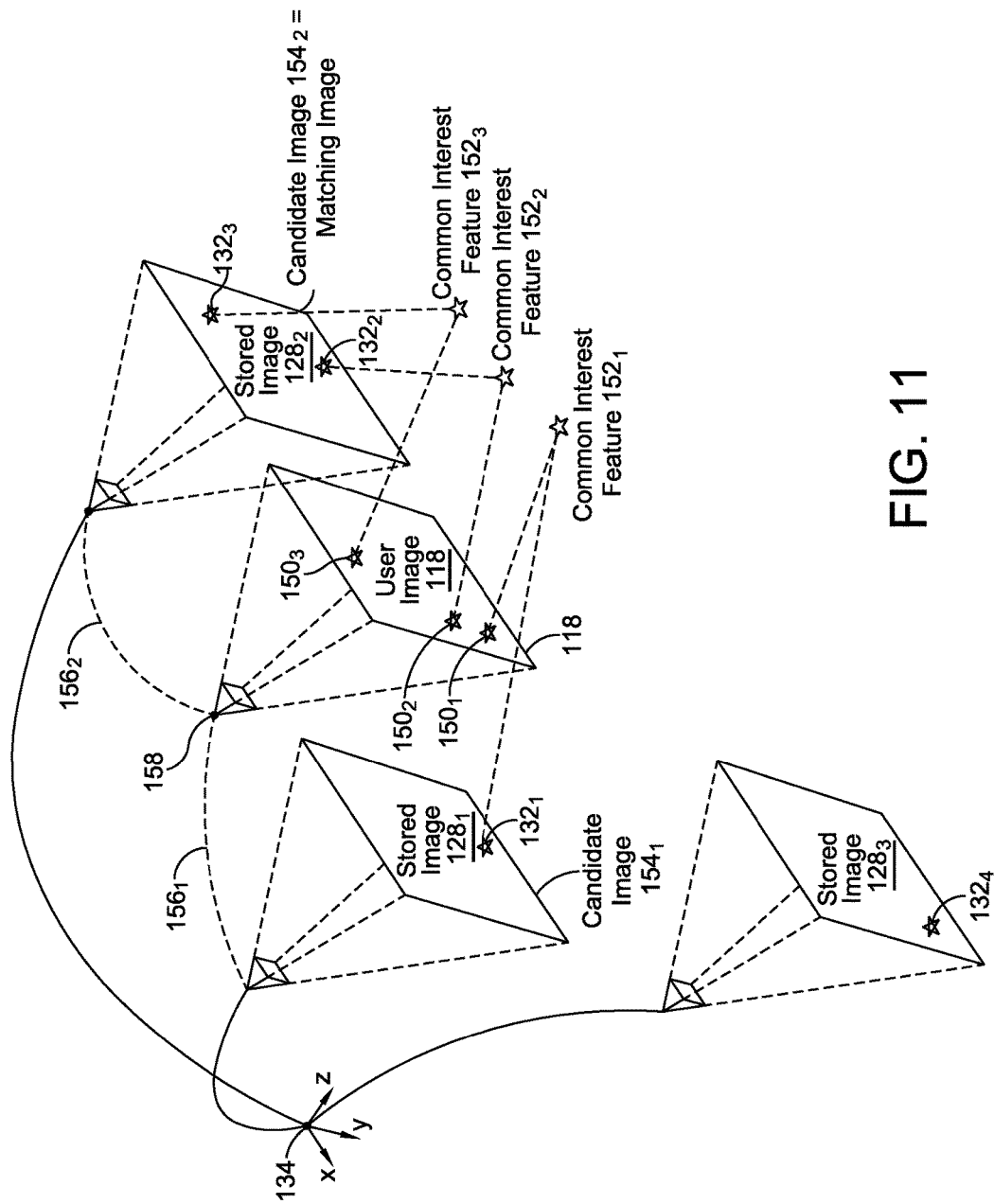
FIG. 11 provides a functional schematic depicting a comparison between a user image and a number of stored images, as detailed in the flowchart of FIG. 10.

Referring to FIG. 11 to schematically demonstrate the image-matching calculation (206), place-recognition processor 104 may first extract a number of interest features $150_{1-n}$ from user image 118 (208). Once interest features $150_{1-n}$ have been extracted from user image 118 (i.e., interest features $150_{1, 2, 3}$ of the example of FIG. 11), place-recognition processor 104 may compare interest features $150_{1-n}$ extracted from user image 118 to interest features $132_{1-n}$ previously extracted from stored images $128_{1-n}$ of map 124 (210) and identify one or more common interest features $152_{1-n}$ between user image 118 and stored images $128_{1-n}$ (212). This comparison may leverage a per-feature comparison metric, which indicates a difference between two interest features in terms of appearance, or provides an indicator of visual similarity or dissimilarity between two features. For example, each interest feature $150_{1-n}$ extracted from user image 118 may be compared to all the interest features $132_{1-n}$ in a given stored image $128_{1-n}$ to identify which of the stored interest features $132_{1-n}$ most visually resembles the interest feature $150_{1-n}$ extracted from user image 118. This operation may be repeated for each interest feature $150_{1-n}$ of user image 118, resulting in common interest features $152_{1-n}$, which represent a series of correlated interest features across user image 118 and stored images $128_{1-n}$.

As shown in FIG. 11, common interest feature $152_1$ is common to both user image 118 and stored image $128_1$ in that the features were likely captured from the same point in space. Similarly, common interest features $152_2$ and $152_3$ both appear in user image 118 and stored image $128_2$. Common interest features $152_{1-n}$ are useful in estimating the position of the camera that captured user image 118, or camera 116, with respect to stored images $128_{1-n}$ (and by association, with respect to map origin 134).

Based on common interest features $152_{1-n}$ as well as known geometric poses $130_{1-n}$ of stored image $128_{1-n}$, processor 122 may proceed to iteratively determine a global geometric pose of user image 118 relative to map origin 134 (214). To make this determination, a number of candidate images $154_{1-n}$ may initially be selected from stored images $128_{1-n}$ of map 124 based on common interest features $152_{1-n}$ (216). Due to common interest features $152_{1-n}$ shared by the user image 118 and the candidate images $154_{1-n}$, each of candidate images $154_{1-n}$ has a high probability of being co-located with user image 118. The database query to determine candidate images $154_{1-n}$ may leverage inverted index 140, discussed above. In the context of the example of FIG. 11, stored images $128_1$ and $128_2$ are identified as candidate images $154_1$ and $154_2$, respectively, due to common interest features $152_{1, 2, 3}$. Stored image $128_3$ is not identified as a candidate image because it lacks common interest features with user image 118.

Next, a respective relative geometric pose $156_{1, 2}$ between user image 118 and each of candidate images $154_{1, 2}$ may be estimated (218) based on triangulated depth values as well as on common interest features $152_{1, 2, 3}$ shared by user image 118 and each of candidate images $154_{1, 2}$ and known geometric poses $130_{1-n}$ of each of candidate images $154_{1, 2}$. This pose-estimation step (218) may involve perspective-n-point methods, which define the problem of estimating a geometric pose based on a set of three-dimensional points in the world and their corresponding two-dimensional projections in an image.

In this embodiment, a "matching" or "reference" image, which represents the "closest" of candidate images $154_{1-n}$ (e.g., the candidate image having a minimum shift between the known geometric pose $130_{1-n}$ of the matching image and the estimated relative geometric pose $156_{1-n}$ of the user image 118) may be selected (220). Referring to FIG. 11, candidate image $154_2$ is identified as the matching image due to its close alignment with user image 118. If a matching or reference image cannot be identified, a prompt may be sent to GUI 114 of navigation application 112 seeking an additional user image(s), as shown in FIG. 9C.

To refine the relative geometric pose $156_2$ estimated for user image 118 in relation to the matching image, or, in the example of FIG. 11, candidate image $154_2$, user image 118 and the matching image may be photometrically aligned (222), providing a very accurate estimate between the two image frames. To determine the global geometric pose of user image 118, and therefore of camera 116, processor 122 may compound the known geometric pose $130_{1-n}$ of the matching image (i.e., of candidate image $154_2$ of the example of FIG. 11) and the relative geometric pose $156_2$ estimated for user image 118 in relation to the matching image (224). The user's location 158 may then be approximated from the global geometric pose of user image 118

(226), such that an appropriate vehicle 107$_{1-n}$ may be directed to the user's location 158 (228) in any appropriate manner.

In one embodiment, a driven or automated vehicle 107$_{1-n}$ may be outfitted with a mobile computing device that operates navigation application 112, or an alternate version of navigation application 112, which may automatically direct vehicle 107$_{1-n}$ to the user's location 158. In another embodiment, a driver may be directed to navigate vehicle 107$_{1-n}$ to the user's location either manually or via system 100.

Using system 100 and method 200, vehicles may be quickly and efficiently directed about a previously mapped space in a manner that optimizes the functionality of the user's mobile computing device, enabling image-based location estimation and navigation without requiring the device to operate power and/or processing consumptive applications, add-ons, or features. Nor is the device required to download and store a map or map data or perform on-board location-estimation computing tasks. As a result, accurate and on-demand location estimation and vehicle navigation is streamlined, while the user's mobile computing device is subject to a minimal burden.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A visual mapping and transportation management system for determining a location of a user and directing a vehicle to the user's location, comprising:
    a navigation application installed upon a user's mobile computing device, the navigation application configured to transmit a user image captured by a camera on the user's mobile computing device to an image-matching server over a communication channel, the image-matching server having a place-recognition processor and a memory that stores a map comprising a framework of linked keyframes, each of the keyframes including a stored image, a known geometric pose corresponding to the stored image relative to a map origin, and a number of interest features extracted from the stored image, wherein the place-recognition processor is configured for:
        extracting a number of interest features from the user image;
        comparing the interest features extracted from the user image to the interest features extracted from the stored images of the map;
        identifying one or more common interest features between the user image and the stored images;
        based on the common interest features and the known geometric poses of the stored images, iteratively determining a global geometric pose of the user image relative to the map origin; and
        directing, over the communication channel, the vehicle to the user's location based on the global geometric pose of the user image.

2. The visual mapping and transportation management system of claim 1, wherein the iteratively determining the global geometric pose of the user image comprises:
    based on the common interest features, selecting a number of candidate images from the stored images of the map, each of the candidate images having a high probability of being co-located with the user image;
    estimating a relative geometric pose between the user image and each of the candidate images, the relative geometric poses based on triangulated depth values and on the common interest features shared by the user image and each of the candidate images;
    based on the known geometric poses of the candidate images as compared to the relative geometric poses estimated for the user image against each of the candidate images, selecting a reference image from the candidate images, the known geometric pose of the reference image most closely approximating the relative geometric pose estimated for the user image against the reference image; and
    calculating a global geometric pose of the user image by compounding the known geometric pose of the reference image and the relative geometric pose estimated between the user image and the reference image.

3. The visual mapping and transportation management system of claim 2, wherein the place-recognition processor is further configured for photometrically aligning the user image with the reference image to refine the relative geometric pose estimated for the user image.

4. The visual mapping and transportation management system of claim 2, wherein:
    the global geometric pose of the user image defines a position and an orientation of the camera on the user's mobile computing device at a time of user image capture; and
    each of the known geometric poses corresponding to the stored images of the map defines a position and an orientation of a mapping camera at a time of stored image capture.

5. The visual mapping and transportation management system of claim 2, wherein the interest features extracted from the stored images and from the user image each comprise an image region detected to present one or more distinguishing characteristics recognizable across different images of a same location in space.

6. The visual mapping and transportation management system of claim 2, wherein the selecting a number of candidate images from the stored images of the map comprises referencing an inverted index that individually maps each of the interest features extracted from the stored images to one or more of the keyframes.

7. The visual mapping and transportation management system of claim 2, wherein the estimating the relative geometric pose between the user image and each of the candidate images comprises estimating the relative geometric poses using perspective-n-point methods.

8. The visual mapping and transportation management system of claim 1, wherein the comparing the interest features extracted from the user image to the interest features extracted from the stored images of the map comprises applying a feature-based comparison metric, the feature-based comparison metric calibrated to indicate a visual similarity or dissimilarity between any two of the interest features.

9. The visual mapping and transportation management system of claim 1, wherein the map origin comprises a position and an orientation with respect to which the known geometric poses of the stored images and the global geometric pose of the user image are calculated.

10. The visual mapping and transportation management system of claim 1, wherein the user's mobile computing device comprises a smartphone, a tablet computer, a laptop computer, a robot, or a digital camera.

11. The visual mapping and transportation management system of claim 1, wherein the vehicle comprises a human-driven vehicle or an autonomous robotic vehicle.

12. The visual mapping and transportation management system of claim 1, wherein the steps of extracting the interest features from the user image, comparing the interest features extracted from the user image to the interest features extracted from the stored images of the map, and extracting the common interest features between the user image and the stored images incorporate bag-of-words techniques.

13. The visual mapping and transportation management system of claim 1, wherein the map comprises a metric-relative map created using simultaneous localization and mapping (SLAM) techniques.

14. An image-based method of estimating a location of a user of a transportation service and directing a vehicle to the location of the user, comprising:
providing a navigation application to a user for installation on a mobile computing device; and
receiving, at an image-matching server and sent from the mobile computing device over a communication channel, a user image captured by the camera, the image-matching server comprising a place-recognition processor and a memory that stores a map comprising a framework of linked keyframes, each of the keyframes including a stored image, known location information corresponding to the stored image relative to a map origin, and a number of interest features extracted from the stored image, wherein the place-recognition processor
extracts a number of interest features from the user image;
compares the interest features extracted from the user image to the interest features extracted from the stored images of the map;
identifies one or more common interest features between the user image and the stored images;
based on the common interest features, selects a number of candidate images from the stored images of the map, each of the candidate images having a high probability of being co-located with the user image;
based on triangulated depth values and on the common interest features shared by the user image and each of the candidate images, estimates a relative geometric pose between the user image and each of the candidate images;
selects a matching image from the candidate images, the matching image representing the candidate image having a minimum shift between the known geometric pose of the candidate image and the relative geometric pose of the user image in relation to the candidate image;
photometrically aligns the user image with the matching image to refine the relative geometric pose of the user image;
compounds the known geometric pose of the matching image and the relative geometric pose of the user image in relation to the matching image, thereby calculating a global geometric pose of the user image in relation to the map origin; and based on the global geometric pose of the user image, directs over the communication channel the vehicle to the location of the user.

15. The method of claim 14, wherein the global geometric pose of the user image represents a position and an orientation of the camera that captured the user image from the user's mobile computing device.

16. The method of claim 14, wherein the user comprises a human or an autonomous robot.

17. A non-transitory computer-readable medium with computer-executable instructions stored thereon executed by a place-recognition processor to perform an image-based method of determining a location of a camera on a mobile computing device of a user of a transportation service and directing a vehicle to the location, the method comprising:
receiving, over a communication channel from a navigation application installed upon the user's mobile computing device, a user image captured by the camera on the user's mobile computing device;
extracting a number of interest features from the user image;
accessing a map stored in the computer-readable medium, the map comprising a framework of linked keyframes, each of the keyframes including a stored image, a known geometric pose corresponding to the stored image relative to a map origin, and a number of interest features extracted from the stored image;
comparing the interest features extracted from the user image to the interest features extracted from the stored images;
identifying one or more common interest features between the user image and the stored images;
based on the common interest features and the known geometric poses associated with each of the interest features extracted from the stored images, determining the location of the camera on the user's mobile computing device; and
directing, via the communication channel, the vehicle to the location of the camera on the user's mobile computing device.

18. The non-transitory computer-readable medium of claim 17, wherein the determining the location of the camera on the user's mobile computing device comprises:
based on the common interest features, selecting a number of candidate images from the stored images of the map, each of the candidate images having a high probability of being co-located with the user image;
estimating a relative geometric pose between the user image and each of the candidate images, the relative geometric poses based on triangulated depth values and on the common interest features shared by the user image and each of the candidate images;
selecting a matching image from the candidate images, the matching image representing the candidate image having a minimum shift between the known geometric pose of the candidate image and the corresponding relative geometric pose of the user image;
photometrically aligning the user image with the matching image to refine the relative geometric pose of the user image in relation to the matching image; and
compounding the known geometric pose of the matching image and the relative geometric pose of the user image in relation to the matching image to calculate a global geometric pose of the user image in relation to the map origin, wherein the global geometric pose of the user image defines the location of the camera on the user's mobile computing device.

19. The non-transitory computer-readable medium of claim 17, wherein the stored images of the map are constructed using a mapping camera that navigates a space represented in the map, and wherein the known geometric poses that correspond to the stored images of the map are determined via simultaneous localization and mapping (SLAM) techniques, wheel odometry, GPS positioning, or LIDAR.

20. The non-transitory computer-readable medium of claim 17, wherein the vehicle is a human-driven vehicle or an autonomous robotic vehicle.

* * * * *